(12) United States Patent
Paya et al.

(10) Patent No.: US 10,599,863 B2
(45) Date of Patent: *Mar. 24, 2020

(54) DATABASE ENCRYPTION TO PROVIDE WRITE PROTECTION

(71) Applicant: Airbnb, Inc., San Francisco, CA (US)

(72) Inventors: Ismail Cem Paya, San Francisco, CA (US); Nelson Aurel Gauthier, Los Angeles, CA (US); Kevin Nguyen, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,911

(22) Filed: Jan. 24, 2019

(65) Prior Publication Data

US 2019/0156052 A1 May 23, 2019

Related U.S. Application Data

(63) Continuation of application No. 15/630,871, filed on Jun. 22, 2017, now Pat. No. 10,229,286, which is a (Continued)

(51) Int. Cl.
*G06F 21/62* (2013.01)
*G06F 21/60* (2013.01)
(Continued)

(52) U.S. Cl.
CPC ...... *G06F 21/6227* (2013.01); *G06F 16/2282* (2019.01); *G06F 21/602* (2013.01);
(Continued)

(58) Field of Classification Search
CPC ............ G06F 21/6227; G06F 16/2282; G06F 21/6218; H04L 63/061
(Continued)

(56) References Cited

U.S. PATENT DOCUMENTS 6,792,425 B2 9/2004 Yagawa et al.
9,146,930 B2 9/2015 Tang
(Continued)

FOREIGN PATENT DOCUMENTS

EP 2 833 274 A1 2/2015
KR 10-2009-0067342 A 6/2009

OTHER PUBLICATIONS

PCT International Search Report and Written Opinion, PCT Application No. PCT/US2016/024689, dated Dec. 14, 2016, 12 pages.
(Continued)

*Primary Examiner* — Shin-Hon (Eric) Chen
*Assistant Examiner* — Dereena T Cattungal
(74) *Attorney, Agent, or Firm* — Fenwick & West LLP

(57) ABSTRACT

An online computer system including a database uses an encrypted table that allows for write protection its contents. Middleware logic operating on the system acts as an interface for access to the database, so that any business logic on the system accesses the database through simple procedural calls to the middleware rather than directly to the database itself. The middleware logic abstracts logic that helps implement write protection with the encrypted table. Data to be encrypted that has been traditionally written to other tables is migrated to the encrypted table, where the data encrypted using an authenticated encryption with additional data (AEAD) algorithm. To implement AEAD, the original table, column, and primary key indicating where the data would have otherwise been stored are together used as additional authenticated data (AAD). This tuple of information is also stored in the encrypted table.

20 Claims, 10 Drawing Sheets

Related U.S. Application Data continuation of application No. 14/673,683, filed on Mar. 30, 2015, now Pat. No. 9,727,742.

(51) Int. Cl.
  *G06F 16/22* (2019.01)
  *H04L 29/06* (2006.01)
(52) U.S. Cl.
  CPC ........ *G06F 21/6218* (2013.01); *H04L 63/061* (2013.01); *G06F 2221/2107* (2013.01)
(58) Field of Classification Search
  USPC .......................................................... 713/165
  See application file for complete search history.

(56) References Cited

U.S. PATENT DOCUMENTS

| | | | |
|---|---|---|---|
| 9,244,914 | B2 | 1/2016 | Trumbull et al. |
| 2003/0123671 | A1 | 7/2003 | He et al. |
| 2006/0053112 | A1* | 3/2006 | Chitkara ............. G06F 21/6227 |
| 2008/0033960 | A1* | 2/2008 | Banks .................. G06F 21/6227 |
| 2008/0046462 | A1 | 2/2008 | Kaufman et al. |
| 2009/0199301 | A1 | 8/2009 | Chandrasekaran et al. |
| 2010/0131457 | A1 | 5/2010 | Heimendinger |
| 2010/0131518 | A1* | 5/2010 | Elteto ................. G06F 21/6227 707/752 |
| 2013/0064364 | A1 | 3/2013 | Orsini et al. |
| 2013/0173924 | A1* | 7/2013 | Kim .......................... H04L 9/32 713/181 |
| 2013/0191650 | A1* | 7/2013 | Balakrishnan ...... G06F 21/6227 713/190 |
| 2013/0246813 | A1 | 9/2013 | Mori et al. |
| 2013/0276122 | A1 | 10/2013 | Sowder |
| 2013/0346365 | A1* | 12/2013 | Kan .......................... G06F 3/061 707/610 |
| 2014/0229729 | A1* | 8/2014 | Roth ................... H04L 63/0471 713/153 |
| 2014/0330767 | A1 | 11/2014 | Fowler |
| 2015/0013006 | A1 | 1/2015 | Shulman et al. |
| 2015/0033032 | A1 | 1/2015 | Furukawa |
| 2015/0229619 | A1* | 8/2015 | Costa .................. H04L 63/0823 713/171 |

OTHER PUBLICATIONS

United States Office Action, U.S. Appl. No. 14/673,683, dated Dec. 23, 2016, 22 pages.
United States Office Action, U.S. Appl. No. 14/673,683, dated May 5, 2016, 16 pages.
United States Office Action, U.S. Appl. No. 15/630,871, dated Aug. 6, 2018, 26 pages.
United States Office Action, U.S. Appl. No. 15/630,871, dated Nov. 3, 2017, 26 pages.

* cited by examiner

Example Table 1

| Primary Key | Column 1 | Account Number | Column 2 |
|---|---|---|---|
| Alice | | ~~123abc~~   def456 | | ← Attack 1
| Bob | | 123abc | |

Attack 2

FIG. 2A
PRIOR ART

Example Table 1

| Primary Key | Column 1 | Account Number | Column 2 |
|---|---|---|---|
| Alice | | 123abc | |
| Bob | | | |

Example Table 2

| Primary Key | Column 1 | Credit Card Number | Column 2 |
|---|---|---|---|
| Alice | | 123abc | |
| Bob | | | |

Attack 3

FIG. 2B
PRIOR ART

Example Table 3

| Primary Key | Bank Routing Number | Bank Account Number | Email Address |
|---|---|---|---|
| Alice | | | |
| Bob | yyy1<br>~~xxx1~~ | 123abc | attack@isp.net<br>~~bob@isp.net~~ |
| Charlie | | | |

Left unmodified by Attack 4

Attack 4

Example Accounts Table

| Primary Key | Routing Number | Account Number | Email | User ID |
|---|---|---|---|---|
| 1 | xxx1 | 123abc | alice@isp.net | ID1 |
| 2 | yyy1 | 456def | bob@isp.net | ID2 |
| 3 | zzz1 | 789ghi | charlie@isp.net | ID3 |

FIG. 3B

Example Payments Table

| Primary Key | Payment | User ID |
|---|---|---|
| 1 | 67.03 | ID1 |
| 2 | 98.02 | ID2 |
| 3 | 100.05 | ID3 |

FIG. 3C

Example Encryption Table 1

| Primary Key | Table Name | Column Name | Primary Key of OT | Cipher text |
|---|---|---|---|---|
| 1 | Accounts | Acct # | 2 | 89bvb2389n28ju2839f |
| 2 | Payments | Payment | 3 | 9283-luzh289h283x234 |
| 3 | Accounts | Acct # | 3 | jkdsfw39e034?2903x80 |

FIG. 3D

Example Encryption Table 2

| Primary Key | Table Name | Column Name | Primary Key of OT | Key Rev | Cipher text |
|---|---|---|---|---|---|
| 1 | Accounts | Acct # | 2 | v3 | 893vb2389n28ju2839f |
| 2 | Payments | Payment | 3 | v2 | 9281.4uzh289h283x234 |
| 3 | Accounts | Acct # | 3 | v2 | jkdsfw39e034?2803x80 |

Key Revision

```
Read/write from ET only for the selected OT/column combination
using existing digital key, ET includes column for key revision
                              805
                               ↓
              Activate key revision process
                              810
                               ↓
Read/write from ET for the selected OT/column combination using
existing digital key and new digital key, write to separate rows for
           each key, validate encryption is working
                              815
                               ↓
Deactivate key revision process, read/write for the selected OT/
        column combination using only new key
                              820
                               ↓
Delete data rows from ET encrypted with old key and selected
                 OT/column combination
                              825
```

FIG. 8

DATABASE ENCRYPTION TO PROVIDE WRITE PROTECTION

CROSS REFERENCE TO RELATED APPLICATIONS

This application is a continuation of prior, co-pending U.S. patent application Ser. No. 15/630,871, filed on Jun. 22, 2017, which is a continuation of U.S. patent application Ser. No. 14/673,683, filed on Mar. 30, 2015 (now U.S. Pat. No. 9,727,742), both of which are incorporated herein by reference in their entirety for all purposes.

BACKGROUND

This description generally relates to database cryptography, and more particularly to database write protection.

Online computer databases are vulnerable to a variety of different types of attacks by third parties. Often, the goal of these attacks is to be able to obtain read access, and therefore access to the substantive contents of the database. To prevent such breaches, online systems have grown more robust over time. One tool in breach prevention is using one or more cryptographic primitives to securely store passwords that permit read access. Cryptographic primitives include using salts, one way functions (e.g., hash functions), cryptographic operations (e.g., encryption, decryption), symmetric cryptography schemes, and asymmetric (or public key) cryptography schemes. Another major tool in breach prevention is using a separate cryptography service to perform various tasks associated with database access, including applying cryptographic primitives as mentioned above. For example, one type of cryptography service involves using a physically separate computing device, one example of which is referred to as a hardware security module (HSM), that is specially designed to securely store cryptographic keys and perform cryptographic processing.

For many online databases, merely having the database breached and read by an intruder is a worst case scenario that merits most if not all of the attention of the online system's security staff. As a result, many online systems do not implement database write protection on top of read protection because all the harm has been done once the database has been read.

For some online systems, however, write protection is at least as important as read protection, and thus merits attention. For example, for an online payments system, breaches that write data to a database can have catastrophic financial implications of their own. FIGS. 2A-2C contains several examples of database write attacks that can cause problems for an online system.

FIG. 2A illustrates an example bank account table containing bank account numbers for a number of users in an online payments system that provides payouts to users. While a read attack that obtains user bank account numbers would be problematic on its own, also problematic would be a write attack that replaces the bank account number of a user with the bank account number of an attacker, for example. As an illustration, if Alice's account number abc123 were overwritten with the attacker's account number def456, any payments that were intended to go to Alice would instead go to the attacker. Such a write attack is dangerous not only due to losses by Alice and the online system, but also because no read attack is needed to cause harm. Alternatively, Alice's account number could be written to another row in the table accessible by the attacker (e.g., Bob's row), who could then read the account number without needing to perform a read attack.

FIG. 2B illustrates a similar example bank account table and an example credit card table. In this example, rather than overwriting or copying data within a single table, a write attack could write data between tables. Some of these attacks may result in erroneous or non-functional behavior in the online system, for example account numbers and credit card numbers may not be able to be written between tables based on the sizes and data types of those columns. These attacks may also result in errors in the business logic implemented on top of the database by the online system, depending upon how these different columns of data are used once read out of the database. However, some of these attacks may result in data that was previously protected by rigorous business logic to become openly visible to the attacker. For example, a column data that was previously protected by a password system may instead end up being visible through an unprotected portion of the web interface provided by the online system. Here, write attacks provide a way to circumvent read protection or other security mechanisms implemented by the online system.

FIG. 2C illustrates another example bank account table. In this example, rather than overwriting or copying elsewhere the data item of interest, a write attack may instead change the data in the surrounding cells in the same row of the table. For example, a write attack may change the bank routing number associated with a user's account, as well as the contact email address for that user. If the attacker controls the account number at the bank corresponding to the new routing number, then any payments made to that user would be redirected to the attacker. Further, emails directed to the account holder may be redirected to an email account associated with the attacker, thus preventing the real account holder from receiving valuable information from the online system about the breach.

SUMMARY

An online computer system including a database uses an encrypted table that allows for both read and write protection of the contents of the database. Middleware software logic operating on the online computer system acts as an interface for access to the database, so that any business logic on the online system that wants to access the database does it through simple procedural calls to the middleware rather than directly to the database itself. The middleware logic abstracts database protection logic that helps implement read/write protection.

To protect against read and write attacks, data to be encrypted that has been traditionally written to other tables is migrated on write (or on read) to an encrypted table (ET), where the data is stored as cipher text. An authenticated encryption with additional data (AEAD) algorithm is used to encrypt or validate the encryption of cipher text. To implement AEAD, the original table (OT) name, column name, and OT primary key (pk) where the data would have been stored prior to the existence of the ET are together used as additional authenticated data (AAD) as a parameter passed in parallel with the OT data or cipher text during encryption or decryption, respectively. The use of AEAD encryption, along with a cryptography service to perform cryptographic operations, provides read protection. If a write attack occurs that changes any element of the AAD, decryption will fail and the failure can be detected and reported accordingly. The OT, OT column, and OT pk are also stored in the row of the ET along with the corresponding cipher text. The AAD may also be augmented with additional information stored elsewhere in the database, as known to the middleware. Once all of the data from a column in an OT has been encrypted in the ET and the encryption has been sufficiently validated for accuracy, the column whose data is now written to the ET can be deleted from the OT, thus preventing a write attack from accessing or modifying the encrypted data.

Various processes are also described, including "safe" (dual)-write and safe read processes for ensuring that data is accessible during the migration of data in a column from the OT to the ET, during migration between generations of cryptographic keys, as well as longer term processes that describe both the general data migration process into the ET, as well as the general key revision process between generations of cryptographic keys.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

FIGS. 2A-2C illustrates example tables showing example write attacks that can affect a database that does not have write protection, according to one embodiment.

FIGS. 3A-3D illustrate a pair of example original tables (OTs) and a pair of example encryption tables (ETs) that highlight aspects of the write protection offered by the online system, according to one embodiment.

FIG. 8 is a flow diagram of a key revision process for the online system, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein

DETAILED DESCRIPTION

I. Online System Overview

Figure 1:
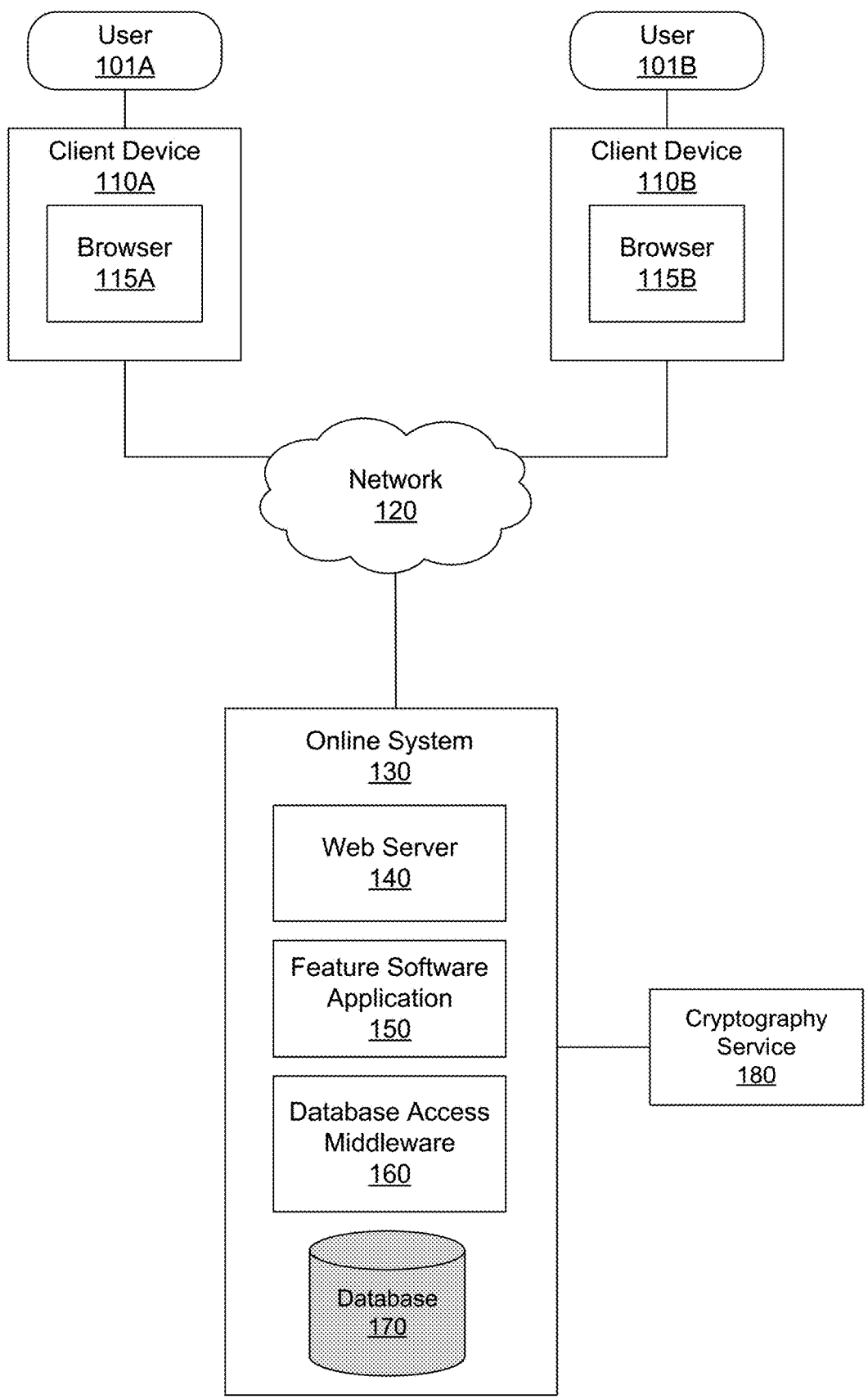
FIG. 1 is a block diagram of a computing environment for an online system that includes a database and which implements read and write protection for the content of the database, according to one embodiment.

FIG. 1 is a block diagram of a computing environment for an online system 130 that includes a database and which implements read and write protection for the content of the database, according to one embodiment. The online system 130 may be any kind of system which stores data that is to be protected from potential attackers. Examples include payments systems that pay users or exchange payments between users, accounts systems that maintain private information about users, booking systems that maintain private itinerary or accommodation information about users, etc.

Users 101 use client devices 110 to interact with the online system 130. A client device 110 can be any device that is or incorporates a computer such as a personal computer (PC), a desktop computer, a laptop computer, a notebook, a smartphone, or the like. A computer is a device having one or more general or special purpose processors, memory, storage, and networking components (either wired or wireless). The device executes an operating system, for example, a Microsoft Windows-compatible operating system (OS), Apple OS X or iOS, a Linux distribution, or Google's Android OS. In some embodiments, the client device 110 may use a web browser 115, such as Microsoft Internet Explorer, Mozilla Firefox, Google Chrome, Apple Safari and/or Opera, as an interface to interact with the online system. In other embodiments, the client device 110 can execute a dedicated application for accessing the online system 130.

The network 120 represents the communication pathways between client devices 110 (e.g., users) and the online system. In one embodiment, the network is the Internet. The network can also utilize dedicated or private communication links (e.g. wide area network (WAN), local area network (LAN)) that are not necessarily part of the Internet. The network uses standard communications technologies and/or protocols (e.g., TCP-IP).

The online system 130 includes a web server 140, a feature software application, database access middleware 160, and a database 170. The web server 140 communicates with the client devices 110 over the network, for example by providing web page content for display in a browser 115. The web server 140 further provides an interface allowing the user to control their interaction with the web server 140, including both sending information from the client device 110 to the web server 140, and receiving data at the client device 140 from the web server.

For example, if the online system 140 is a payment system for sending and receiving payments between users, the web server 140 may provide graphical user interface allowing the user to create and manage their account, add bank routing and bank account numbers to send and receive money from, add credit card numbers to send and receive payments from, add a contact email address where they can be contacted regarding payments processed by the online system 140, view payment histories and dollar amounts of payments, etc.

The web server 140 processes and communicates data to a feature software application 150 (referred to as application 150) that executes the features provided by the online system 140. Application 150 carries out tasks based on information (e.g., requests) received externally and based on software code that determines what actions to take in any given situation. Generally, application 150 includes the business logic of the online system. Continuing with the payments system example above, application 150 may include software logic for processing payments by instructing money to be transferred between accounts, provide notice via email when payments have been made, and so on.

During the normal course of operation, the online system 130 will create, read, update, and delete (perform CRUD operations on) data in a database 170. To provide a clean software abstraction for performing these operations, a separate database access middleware 160 (which is also software) controls database access. Any other portion of the system that wants to perform a CRUD operation (generally functions within application 150) with respect to the database 170 instead makes the appropriate function call to middleware 160 rather than performing an operation directly with the database 170. Middleware 160 makes available to application 150 or any other piece of software seeking to access database 170 a relatively simple set of function calls for performing CRUD operations. These include read and write requests to the database 170. This assists the online system in reducing the complexity of software code in application 150 as any operation the application 150 wants to perform on data stored in the database is encapsulated by one of the functions made available by the middleware 160.

Through this abstraction, the database access middleware 160 is also able to control encryption of data in the database in order to provide read and write protection. Because middleware 160 is logically abstracted and separated from the 150, the details of how the encryption processes are managed does not need to be known by application 150, further reducing the complexity 150. In addition to providing function calls for CRUD operations, middleware 160 also provides function calls and parameters allowing the application 150 or an external online system administrator or software developer to specify what elements of data in database 170 (e.g., particular columns of particular tables) are to be encrypted.

The online system 130 also communicates with a cryptography service 180, which is also referred to as an encryption/decryption oracle. The cryptography service 180 safeguards cryptographic keys (e.g., private keys in a public key cryptography scheme) and performs at least some (though not necessarily all) of the cryptographic primitives (e.g., encryptions, decryptions, hashing, truncation, and masking) involved in safeguarding data against read attacks. In one embodiment, the cryptography service 180 is a HSM that includes a crypto processor. A crypto processor is a computing device such as a dedicated computer, system-on-a-chip, or microprocessor that can be attached to another computer or server as, for example, a plug-in card or an external device. In one embodiment, the cryptography service 180 can be accessed (e.g., rented) through paid systems such as AMAZON WEB SERVICES (AWS) CLOUDHSM. The cryptography service 180 can use a variety of cryptography schemes including symmetric key cryptography schemes and public key cryptography schemes.

In between the cryptography service 180 and the online system 130 may be one or more intermediate servers. These intermediate servers may have varying levels of security. In some implementations, some cryptoprocessing functions may be performed in addition to the final encryption or decryption performed by the cryptography service 180, in attempt to guard against attacks that try to take advantage of the relative insecurity of intermediate servers. For example the middleware 160 may use masks on cryptographic keys or data to be encrypted or decrypted prior to passing data to the cryptography service 180. These types of security help prevent read attacks that either attempt to access data in transit between the online system 130 and 180, or attempt to emulate either the online system 130 or cryptography service 180 to cause data to be transmitted when it should not be. Further detail regarding securing the online system 130 and cryptography service 180 against read attacks can be found in co-pending U.S. patent application Ser. No. 14/515,499, which is incorporated by reference herein in its entirety. The computing systems and techniques described in that application are compatible for use alongside the computing systems and techniques described in this application.

Database 170 may be a relational database or a non-relational database that uses structured logic (for example in the middleware 160) to enforce proper database behavior. The database 170 may be accessed using a structured query language (SQL). In the case of a relational database, the database will generally consist of a number of tables, each having a number of columns, where the rows of each table are indexed according to a primary key that is unique for each row.

Although the components of the online system 130 and cryptography service 180 have been described as single elements, in practice there may be many of each element in order to implement the online system 130. For example, the online system 130 may consist of a number of server-class computers existing in several different geographic locations, such as data centers. The web server 140 and each software module such as application 150 and middleware 160 may be replicated across each data center, with the different data centers in communication to provide additional redundancy and data security. Database 170 may be similarly replicated. Further, there may be more than one intermediate servers between the online system 130 and the cryptography service 180, and the cryptography service's 180 load may be split among several computing devices.

II. Original Table and Encrypted Table Database Schemas

FIGS. 3A-3D illustrates a pair of example original tables and a pair of example encryption tables that highlight aspects of the write protection offered by the online system, according to one embodiment. To implement write protection at least one new table, herein referred to as the encrypted tables (ET) is added to the database 170. Generally, the ET stores data that would have otherwise been stored in another existing table, generally referred to as the original table (OT), instead. The ET stores data in a cipher text format.

The ET also stores sufficient information to fully specify the original location of where the data would have been stored in the OT, which includes the table name where the data would have been stored, the column name where the data would have been stored, and primary key (pk) (or row) of the OT where the data would have been stored. Each row in the ET corresponds to a row/column combination in one of the OTs of the database 170. A single ET may store data from multiple OTs easily, as the table/column/OT pk information (herein referred to as the table/column/OT pk tuple) stored in each ET row allows data from different OTs to be distinguished from each other.

In some instances, no OT will exist for new data that is to be encrypted and stored in the ET right from the start. In this instance, the OT name and OT column name for that data are chosen by the system administrator based on whatever database schema is desired. However, no actual OT corresponding to the chosen OT name needs to actually exist, these names simply serve as a mechanism by which the middleware 160 can identify this data versus other data from other OTs. The middleware 160 can also keep track of the OT pk as new data is added for this chosen OT/OT column name combination, and increment it as new rows are added. Additionally, the middleware 160 uses the OT name and OT column name chosen for this data in CRUD operations on behalf of applications 150.

One schema for the ET specifies that the ET includes a primary key (pk) column, a table (or table name) column, a column (or column name) column, a column for the pk from the OT from which the data for that row in the ET originated (also referred to as the OT pk column), and a cipher text column. The ET may also have additional columns.

The primary key column of the ET is simply the row of the ET. To avoid confusion between the pk of the ET and the pk of the OT, herein the pk of the ET is referred to as the row of the ET, and the pk of the OT is referred to as the OT pk. Note also that the term "primary key" refers to the row of a table, whereas the previously introduced term "cryptographic key" refers to a key used to perform cryptographic primitives, such as the encryption/decryption of data into/out of cipher text.

The table column of the ET contains the name of the OT from which the data in that row of the ET originated. Likewise, the column column of the ET contains the name of the column in the OT from which the data in that row of the ET originated. Likewise, the OT pk column is the row in the OT from which the data in that row of the ET originated.

The cipher text column stores the encrypted data from the OT. Generally, an OT's schema will specify, for any given column of data, the maximum bit size, format, and/or type of data that may be stored in that column. The cipher text column does likewise, however the maximum size, format, and/or type of the encrypted version of the data that is stored in the cipher text column will almost always differ from how the data was originally specified to be stored in the OT. For example, an OT data column may specify that that an account number column is to store data as an 32-bit unsigned integer. However, in encrypted form in the ET, the cipher text column may specify that data is to be stored as a 128 bit string instead. Further, as the ET may store data from multiple OTs, the change of size/format/type between the OT and the ET standardizes data storage so that all data may be encrypted with the same process, and so that all data can be stored in the cipher text column alone.

In order to secure the ET against write attacks, the middleware 160 is configured to make use of the data in the other rows of the ET (e.g., the pk column, the table column, and the column column, as well as additional columns in some implementations) to execute encryption/decryption using an authenticated encryption with additional data (AEAD) algorithm carried out in conjunction with the cryptography service 180. In one implementation, the additional authenticated data (AAD) for implementing the AEAD algorithm includes at least the following tuple of information from the ET row of the OT data to be encrypted: {table name, column name, OT pk}. The AAD is not part of the cipher text, but is instead used to influence the calculation of the cipher text during encryption and decryption.

To encrypt OT data, the middleware 160 passes OT data and the AAD to the cryptography service 180, which returns a cipher text that the middleware 160 writes in the cipher text column of the ET. When the middleware 160 requests decryption, the middleware 160 passes the cipher text and the AAD to the cryptography service 180. Assuming neither the cipher text nor the AAD have been modified by a write attack, the cryptography service 180 will return the OT data in plaintext. However, if a write attack has altered any of the three items of information in the AAD or the cipher text, the decryption will fail.

FIGS. 3A-3D illustrate example OTs and ETs. FIGS. 3A and 3B illustrate example OTs, with an example accounts table having routing number, account number, email, and User ID columns and corresponding data, and an example payments table having payment and User ID columns. Example encryption table 1 (ET1) illustrates several rows of the OTs having been written to ET1. For example, in row 2 of ET1, the table name "Payments", column name "Payment" and primary key of the Payments table "3" specify the originating location of the OT data. The cipher text for row 2 of ET1 stores an encrypted version of the payment, 98.02, and the AAD may, for example, be the string "PaymentsPayment3".

The AAD may also include additional information beyond just the tuple. The additional information may be one or more items of data from any OT in the database 170 that is immutable over the timescale during which the OT data to be encrypted will be read and written. Despite being added to the AAD, this additional information is not added as a column in the ET. This prevents write attacks that affect the ET from also changing the additional information, as unless the attacker has knowledge of which other data the middleware 160 is using as additional information in the AAD, they will not know what data to change to cause decryption to be successful during a write attack.

Using FIGS. 3A-3C as an example, the database 170 may include an OT having a column for a user's email address (e.g., the Accounts table), that may be different from the OT having the data to be encrypted (e.g., the Payments table). Further, in this example the middleware 160 is programmed to know that the email address column from the Accounts table is to be used as additional information in the AAD. In some instances other columns, such as the User ID columns in both the Accounts and Payments table, may be used to identify which row to obtain the additional information for the AAD from. When the ET row is created, the middleware 160 inserts the tuple information into the table name, column name, and OT pk columns of the ET for that row. To encrypt the OT data in the ET row, the middleware 160 accesses the tuple and OT data from the ET, and separately access the additional information (e.g., the email address) from the OT (e.g., the Accounts table), combines the tuple and the additional information to create the AAD (e.g., "PaymentsPayment3bob@isp.net"), and passes the AAD and the OT data to the cryptography service 180 for encryption. To perform the combination, a number of operations may be performed such as concatenation or by prefixing each item of information with its length prior to concatenation to avoid ambiguity regarding which portion of the AAD is related to each contributing item of information. When the cipher text is received back from the cryptography service 180, the data is stored in the cipher text column of the ET. Thus, the data in encrypted without storing the additional information in the AAD in the ET.

The type of encryption used by the online system 130 and cryptography service 180 to generate the cipher text may vary. In one embodiment, symmetric block ciphers such as the Advanced Encryption Standard (AES) are used to create the AEAD algorithm that is used by the cryptography service 180 to encrypt OT data using the AAD and cryptographic key. One example of a fully specified AEAD algorithm is AES-GCM (Galois counter-mode).

In some implementations, the ET may also include a key revision (key rev) column. Encrypted table 2 in FIG. 3D illustrates such a table. The key rev column specifies what generation of cryptographic key was used to encrypt the data in that row of the ET. For example, in FIG. 3D, "v2" indicates a second generation cryptographic key, and "v3" indicates a third generation cryptographic key newer than the second generation cryptographic key. The key rev column generally does not store the cryptographic key itself. In this way, the middleware 160 and cryptography service 180 knows which generation of cryptographic key needs to be used to encrypt or decrypt the data for performing a write or read operation on the column, and also so that the middleware 160 and cryptography service 180 can migrate the row to a new generation of cryptographic key, as circumstances dictate. It is possible that the ET may store the same piece of data in multiple rows, where each such row stores the data with a different generation of key. This may be used, for example, during verification of the new cryptographic key, so that data encrypted with the old cryptographic key (old key) is not lost by accident during the migration to the new cryptographic key (new key). This is further described below with respect to FIGS. 8 and 9.

III. Migration Process

Figure 4:
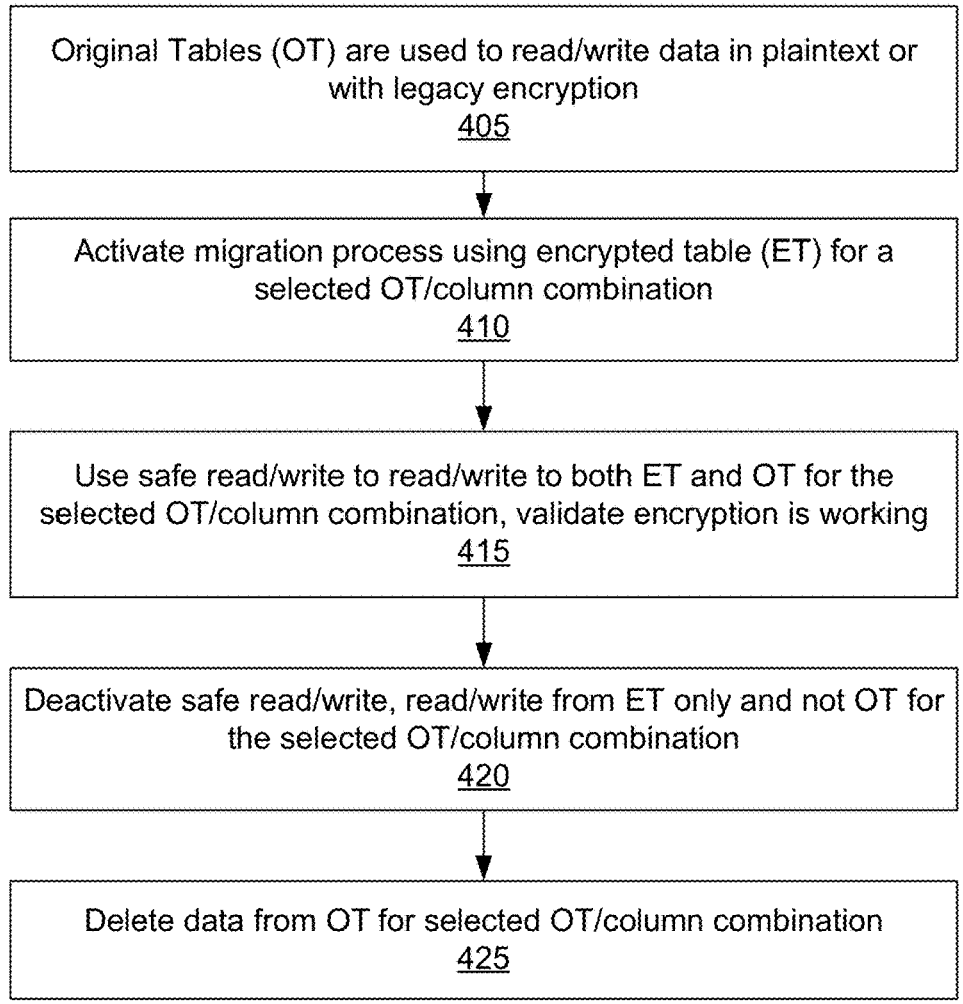
FIG. 4 is a flow diagram of a migration process for the online system, according to one embodiment.

FIG. 4 is a flow diagram of a data migration process for the online system, according to one embodiment. The data migration process (or simply migration or migration process) refers to the processes carried by the application 150, middleware 160, and/or in some cases administrator to transition a column of OT data that is either stored in plaintext 405 or stored using a legacy encryption 405 to instead be stored in ET, thereby providing write protection to the column's data. Migration of data can be implemented in the online system 130 without altering the schema of an existing database 170.

To begin encrypting data stored in OTs, an administrator will modify application 150 to specify that middleware 160 should begin encrypting the data of a column of an OT (or more than one column of an OT or more than one OT at a time). The middleware 160 will flag that OT column as having to be stored in the ET instead. This initiates a process 410 in the middleware 160, whereby each time data is to be written to the selected column of the selected OT, the data is written to new (and then subsequently existing) rows in the ET.

In order to verify that the encryption is working properly (e.g., to guard against cryptography system failure), and in order to ensure smooth operation of the online system 130 for the application 150 and users, the activation of the write migration process does not immediately deprecate the OT column where the data used to be written to. Instead, during the initial stage of migration, a "safe" (dual) write process 415 is used whereby not only is data written to the ET as described above, but data is also written to the OT column as well for some period of until 1) all rows of the OT column have been written to the ET, and 2) the middleware 160 or an administrator is sufficiently confident that the encryption is working properly. The safe write process is described with respect to FIG. 5 below. The process for performing a read while data is initially being migrated (i.e., while safe writes are being performed) is described with respect to FIG. 6 below, and is herein referred to as a "safe read" for clarity.

Once these conditions are met, safe write can be deactivated 420 and going forward the middleware 160 will write to only the ET and not the OT column. The non-safe write process (i.e., non-migration or normal write process) is described with respect to FIG. 7 below. At this point, the OT column data can be deleted 425. Normal reads may also be performed as well, which are also discussed below. In an instance where data is encrypted from the start and no corresponding OT or OT column exists or previously existed prior to the data being added, safe write and safe read are not used as there is no fall back OT data to rely on. For this kind of data, the normal write process is used to write data to the ET and the normal read process is used to read data from the ET.

IV. Safe Write

Figure 5:
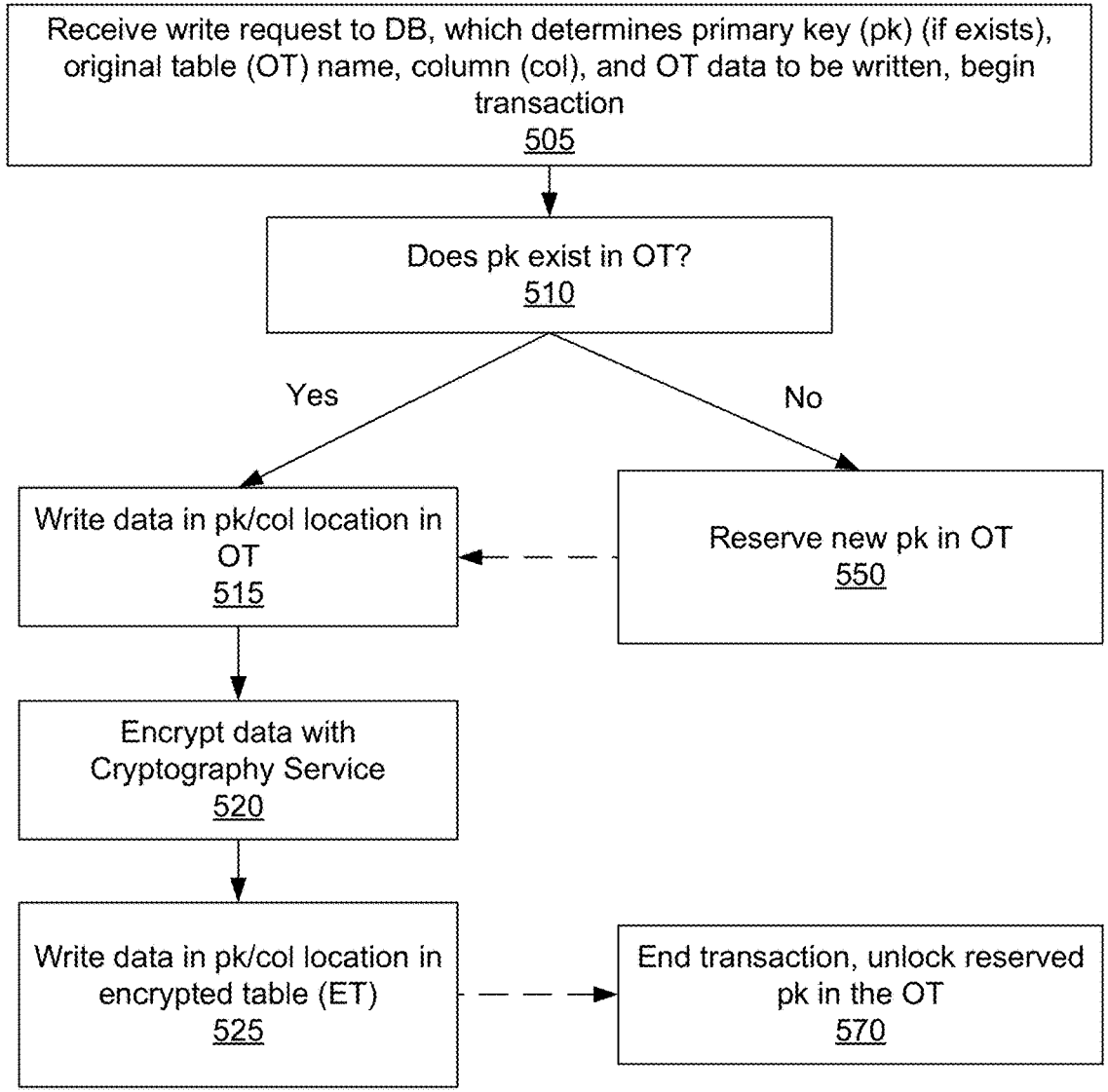
FIG. 5 is a flow diagram of a protected (dual) write operation for use by the online system during migration, according to one embodiment.

FIG. 5 is a flow diagram of a safe write operation for use by the online system during migration, according to one embodiment. The middleware 160 receives 505 a request to write to the database 170. The write request either includes or causes a database query to determine the OT name, the column in the OT, and the data to be written. This request may be a create operation to create a new row in the OT, or it may be an update operation to update an existing row in the OT. In the case of an update write request 505, the write request will also include or determine the pk in the OT for the row corresponding to that data.

If 510 the OT pk exists in the OT, i.e. if it is known or can be derived from the request, then the middleware 160 carries out a first set of operations, and if the OT pk is not known such that a new row needs to be created in the OT to store the data, then the middleware 160 carries out a second set of operations.

Assuming the OT pk is known or derived, a safe write is performed including a write operation to the OT, as well as a write operation to the ET as introduced above. To perform both write operations, a transaction state is initiated with the database 170 that is exited when the middleware can confirm that both the ET and OT writes were performed successfully. The write operation to the OT 515 may, for example, be a simple SQL operation to overwrite/update the provided data to the appropriate OT/column/pk. If the data in the OT is encrypted with a legacy encryption, the middleware 160 or the cryptography service 180 performs the legacy encryption before writing the data to the OT.

For the write operation to the ET, the OT name, column name, OT pk tuple, and any additional information are combined to form the AAD. The middleware 160 passes to the cryptography service 180 the OT data to be encrypted, the AAD and an identification of which cryptographic key is to be used for encryption. The cryptography service 180 returns the cipher text to the middleware 160 which in turn writes 525 a new row to the ET. Specifically, the middleware 160 writes each column of the tuple in the appropriate column of the ET, and writes the cipher text to the cipher text column of the ET. Like the write to the OT, this may be a simple SQL operation. Any subsequent safe writes for that ET row (i.e., that tuple) are similar, except the same ET row can be reused and overwritten, rather newly adding a row to the ET for each update operation.

Alternatively, the OT pk may not exist. This will most commonly occur for new data that does not have a corresponding row in the OT. If the OT pk is not known, the transaction state introduced above also enforces atomicity in the creation and use of rows of the OT. The middleware 160 reserves 550 a new row/pk in the OT and preventing (or "locking") the OT and/or database 170 from re-using the reserved row/pk or duplicating the row/pk and/or write different data from another database operation to the reserved row or another row having the same pk. In one embodiment, the transaction state may include locking the entire OT and/or database 170 from allowing any new rows/pks to be created in the OT until the transaction is complete and the OT and/or database 170 is unlocked. However, in other embodiments, less onerous safeguards may be implemented to prevent any other database operations from affecting the cells of the reserved row/pk in the OT other than the write request that caused the reserved row/pk to be created in the first place.

The middleware 160 writes 515 the data to the OT as specified by the OT/column/new (reserved) pk tuple. This is the same step as the overwrite 515 mentioned previously, except that data is added rather than being updated because the row is new. Also as described above, the middleware 160 has the data encrypted 520 by the cryptography service 180 and writes 525 the data to the ET 525. Although the reservation 550 and write 515 steps are described here as separate steps, in practice these steps may occur simultaneously, for example the database operation of adding a new row may be the triggering action that causes a pk to be assigned to the new row, which may then initiate the transaction state causing the pk to be reserved until the write to the ET is complete.

Once the data has been written to both the new pk of the OT and the new row of the ET, the transaction is completed such that the reserved row/pk is no longer reserved, thereby allowing other database operations to interact with the previously reserved row/pk. However, in the event that the encryption fails and/or the write 525 to the ET was not successful, having the pk/row of the OT reserved allows the entire write process to be rolled back. This may be accomplishing by deleting the data from the reserved pk/row of the OT and sending an indication to the middleware 160 that the write operation failed. The transaction state may then be exited, thereby allowing other operations to use the previously reserved pk/row of the OT due to the rollback.

V. Safe Reads

Figure 6:
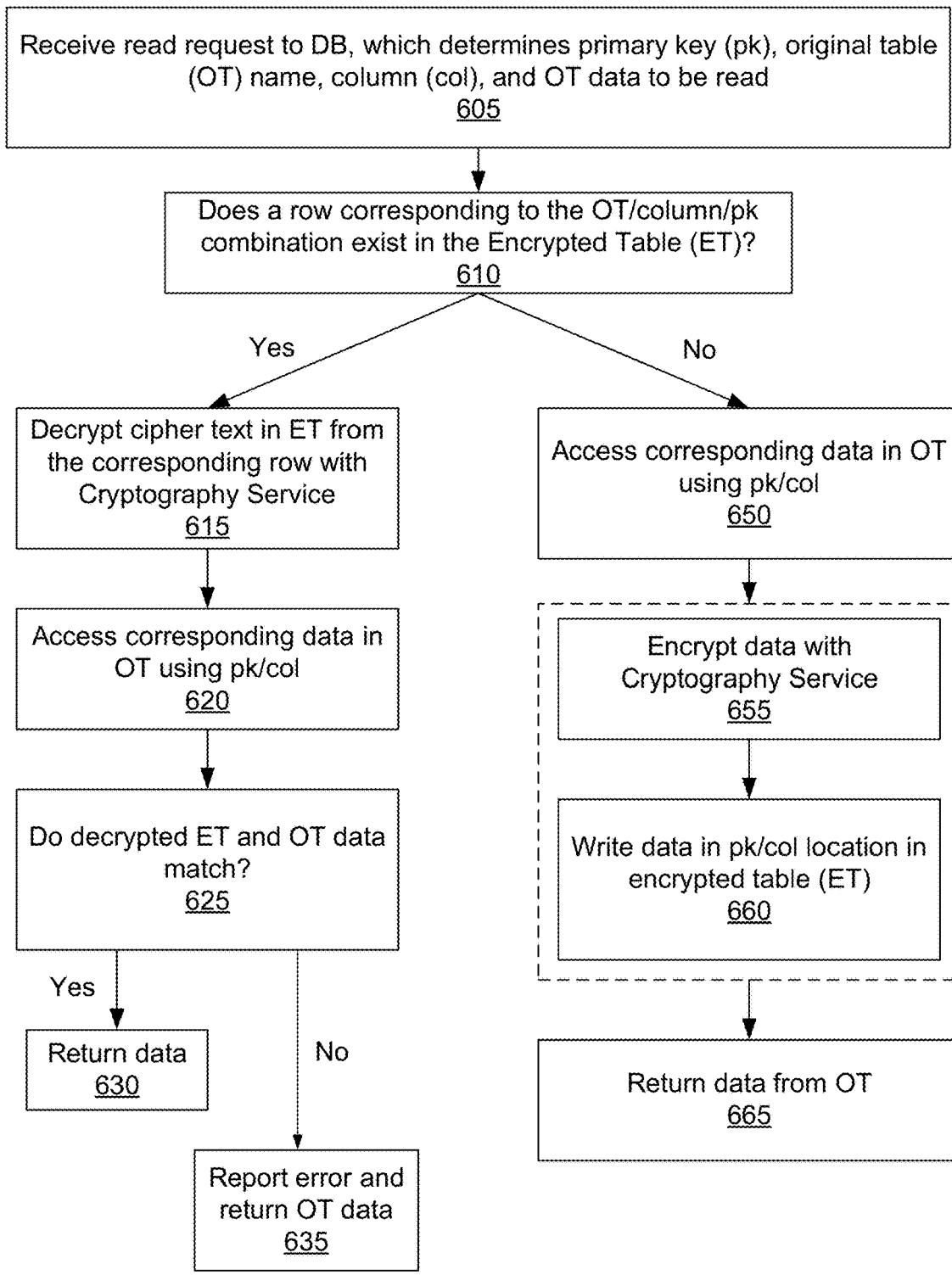
FIG. 6 is a flow diagram of a protected read operation for use by the online system during migration, according to one embodiment.

FIG. 6 is a flow diagram of a safe read operation for use by the online system during migration, according to one embodiment. The middleware 160 receives 605 a request to read from the database 170. The read request includes a query that uniquely identifies the row, column, and table of the OT to be read. The middleware 160 determines 610 whether the data can be read from ET. To make this determination, the middleware 160 checks 610 whether a row exists in the ET that matches the OT/column/OT pk tuple received and/or derived from the read request. If such a row does exist in the ET, the middleware 160 constructs an AAD based at least on the tuple from the corresponding row in the ET and any additional information used by the middleware 160 and sends 615 the AAD, the cipher text from that row of the ET, and a reference to the cryptographic key to be used for decryption to the cryptography service 180 for decryption.

The middleware 160 also access the data 620 from the OT using the tuple. If the data in the OT is encrypted with a legacy encryption, the middleware 160 or the cryptography service 180 performs decryption of the legacy encryption as well. Although FIG. 6 illustrates steps 615 and 620 as occurring one after the other, in practice these steps may be performed in parallel, as neither requires the outcome of the other in order to proceed.

To validate that the encryption with the ET is working properly, the middleware 160 compares 625 the returned, decrypted ET data from cryptography service 180 against the data from the OT. If the encryption is working properly and no write attack has been performed that alters the AAD or ciphertext, the decrypted ET data will match the corresponding data from the OT. The middleware 160 can then return 630 the data to the application 150. If the decryption failed, either something went wrong with encryption or decryption, or a write attack affected some item of data used in the AAD. The middleware 160 can then report 635 an error and/or carry out other fallback instructions. In this instance, to ensure smooth operation of the application 150, the middleware 160 returns the OT's version of the data, because the error in the decryption means that the decrypted ET data is not reliable.

If a row corresponding to the received OT/column/OT pk tuple does not exist in the ET, then the middleware 160 accesses 650 the data from the OT instead. Depending upon the implementation, the middleware 160 may also include logic to carry out a write operation to the ET. This helps speed the migration process, as the ET will be added to on-read as well as on-write. In this case, the OT data, the AAD, and an identification of the cryptographic key to be used for encryption are sent 655 to the cryptography service 180. This step is similar to step 520, described above with respect to safe writes. The cryptography service 180 passes back cipher text which the middleware 160 receives and in turn writes to a new row in the ET. This step is similar to step 525, also described above. The middleware 160 returns 655 the data from the OT to the application 150.

VI. Normal Writes and Reads

Figure 7:
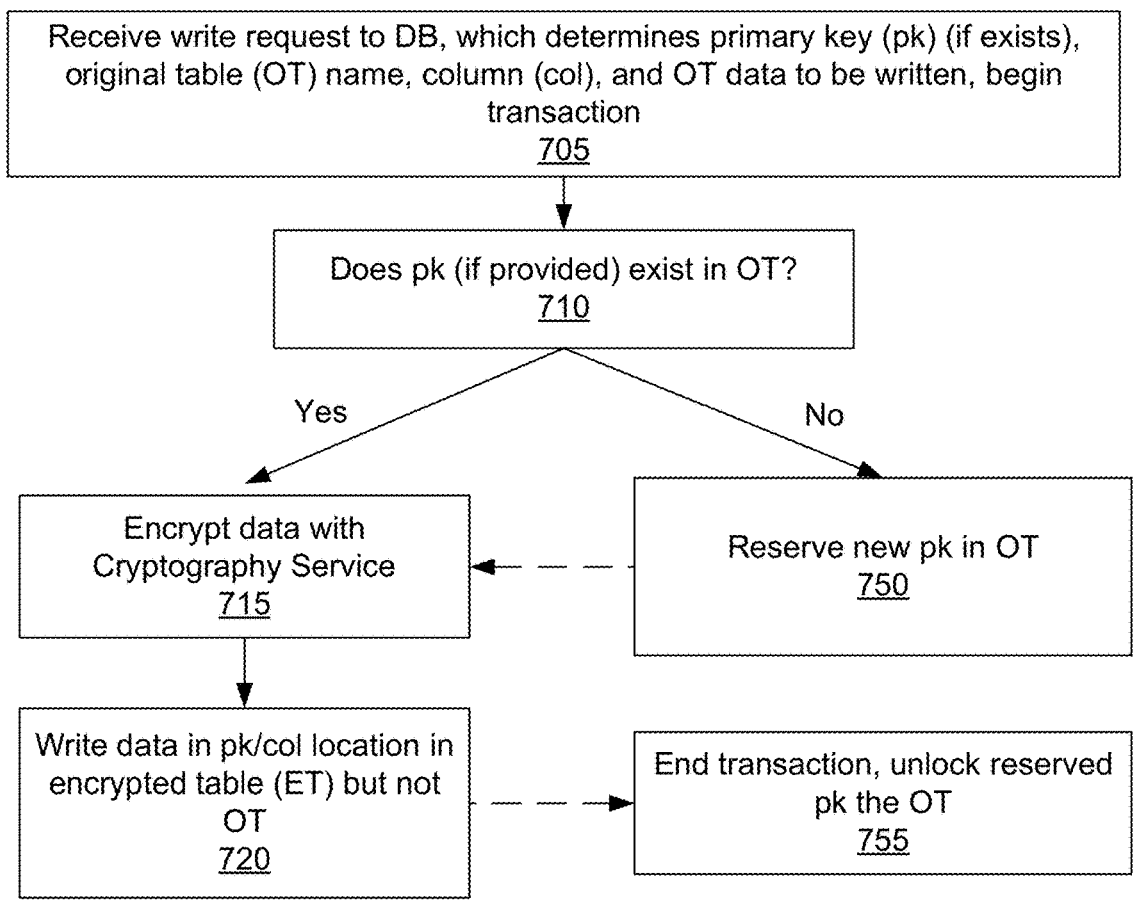
FIG. 7 is a flow diagram of a non-protected (non-dual) write operation for use by the online system after migration, according to one embodiment.

FIG. 7 is a flow diagram of a non-safe (i.e., normal) write operation for use by the online system after migration, according to one embodiment. The middleware 160 receives 705 a request to write to the database 170. The write request is similar to the request from step 505 described above. Similarly to step 510, if 710 the OT pk exists in the OT, i.e. if it is known or can be derived 510, then the middleware 160 carries out a first set of operations, and if the OT pk is not known such that a new row needs to be created in the OT to store the data in the ET, then the middleware 160 carries out a second set of operations.

Assuming the OT pk is known or derived, a normal write is performed including a write operation to the ET. However, different from a safe write, a normal write does not include a second write to the OT. To perform the write operation, a transaction state is initiated with the database 170 that is exited when the middleware can confirm that the ET write was performed successfully. The write operation to the ET is the same as steps 520 and 525 described above. Generally, the middleware passes the cryptography service 180 the OT data, the AAD, and an identification of the cryptographic key to be used for encryption 715, and the cryptography service 180 returns the cipher text. The cipher text is then written 720 to the row in the ET corresponding to the tuple.

If the OT pk is not known (e.g., new row to be written), the transaction begins 750 with the middleware 160 reserving a new row/pk in the OT, and locking the OT and/or database 170 so that no other database operations can be carried out on the cells of the reserved row or using the reserved PK until the transaction is complete and the row/pk is unlocked.

With the new pk for the OT now having been created, the middleware 160 sends 715 to the cryptography service 180 the data, the AAD, and an identification of the cryptographic key to be used for encryption, and writes 720 the returned cipher text to the ET. These steps are similar to steps 520 and 525, respectively. Once the data has been written to the ET, the transaction is completed and the reserved row/pk are unlocked 755.

Although not separately illustrated, after migration completes and normal writes are being used to write data to the ET, normal reads may be performed by performing steps 605, 610, 615, 630 described with respect to FIG. 6 above. Once the decrypted cipher text from an ET row is received 615 from the ET, it can be directly returned 630 to the requesting application 150 without needing to perform the extra access 620 and comparison 625 steps described above.

VII. Key Revision Process

FIG. 8 is a flow diagram of a key revision process for the online system, according to one embodiment. Key revision is a process whereby the online system 130 and cryptography system 180 officially discontinue use of an old cryptographic key and begins using a new cryptographic key in order to increase security of the system. Key revision is not instantaneous, as any data encrypted with the old key needs to be decrypted with the old key and re-encrypted with the new key before the old key can be said to be no longer in use Prior to implementation of the key revision process, it is assumed that all of the data in the ET has been encrypted 805 using the same, existing key to be replaced. In one embodiment, the ET has a schema as illustrated in FIG. 3D, including a key revision column listing the generation of cryptographic key used to encrypt the data of that row of the ET.

The key revision process is activated 810 either in the middleware 160, by a system administrator, or by the cryptography service 180. The key revision process may be a periodic process that occurs automatically, or responsive to an external event such as an administrator action. Activation of the key revision process causes the cryptography service 180 to begin encrypting OT data stored in the ET using the new key rather than the old key. Once key revision is activated, each time that data is to be encrypted for storage in the ET, for example upon write operation and/or upon read operation, the data is encrypted with the new key rather than the old key.

In order to verify that encryption using the new key is working properly, and in order to ensure smooth operation of the online system 130 for the application 150 and users, the activation of the key revision process does not immediately deprecate the old key. The old key and the rows of the ET storing data encrypted with the old key is stored until 1) all of the data in the ET has been written to a new row in the ET and encrypted with the new key, and 2) the middleware 160 or an administrator is sufficiently confident that the encryption is working properly. As a result, after any decryption with the new key (e.g., on read operation), the encryption can be verified by comparing against the decrypted version of the data stored with the old key. Similarly to the process for initial migration of data to the ET described above with respect to FIG. 5 above, this process is also referred to as a "safe write" process, and is described below with respect to FIG. 9 below.

Once these conditions are met, the safe write process can be deactivated 820 and going forward the middleware 160 will write to only the ET rows corresponding to the new key. At this point, the rows in the ET corresponding to the old key can be deleted 825.

VIII. Key Revision Safe Write

Figure 9:
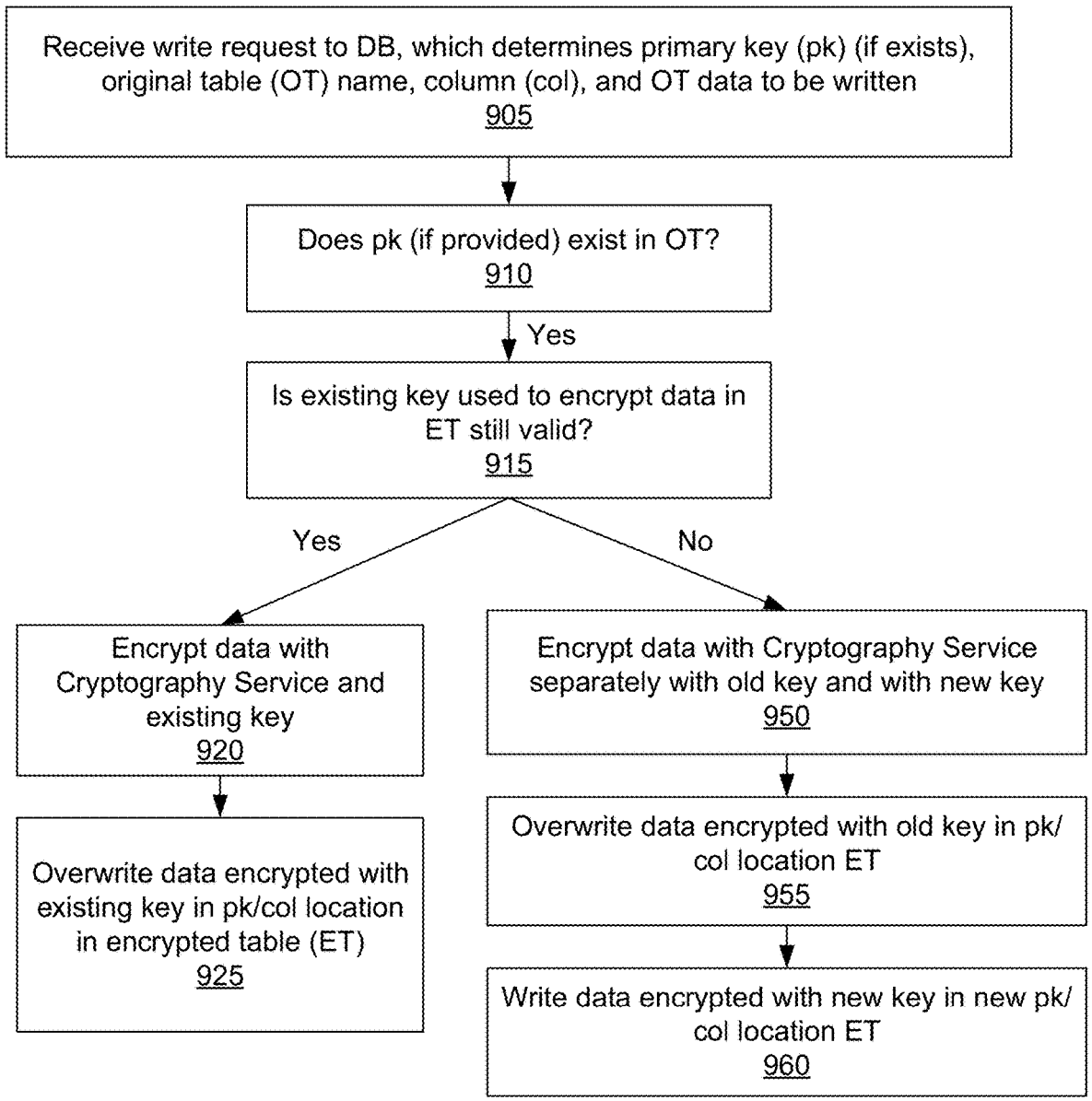
FIG. 9 is a flow diagram of a protected write during a key revision operation for the online system, according to one embodiment.

FIG. 9 is a flow diagram of a safe write operation during a key revision process for the online system, according to one embodiment. The middleware 160 receives 905 a request to write to the database 170. Step 905 and the contents of the write request in step 905 are similar to step 505 and the contents of that step's write request, described above with respect to FIG. 5. If 910 the OT pk exists in the OT, i.e. if it is known or can be derived from the request, then the middleware 160 carries out a first set of operations, and if the OT pk is not known such that a new row needs to be created in the OT to store the data, then the middleware 160 carries out a second set of operations.

As key revision only needs to be performed on items of data that have been encrypted using an old cryptographic key, the key revision process is generally only applicable in this situation. New items of data can simply be written to the ET with the new cryptographic key (not shown). For data encrypted using an old key, once the data is identified in the ET and the pk of the OT is known, the middleware 160 determines 915 whether the key used to encrypt the OT data in the ET is a current-generation (i.e., new) key for encryption, or whether the key is out of date (i.e., old key). In an implementation where the ET has a column dedicated to storing the key revision (key generation) used to encrypt the data, for example as illustrated in FIG. 3D, the middleware 160 may make this determination by performing a SQL query to read out the key rev value from that column based on the OT/column/OT pk tuple from the write request.

If the old (existing) key that was used to encrypt the data is still valid, then a normal write can be performed and no additional steps are performed. Specifically, the middleware 160 passes to the cryptography service 180 the OT data, the AAD, and an identification that the new key (same as the existing key) is to be used for encryption 920, and the cryptography service 180 returns the cipher text. The middleware 160 then overwrites 925 the cipher text in the cipher text column and row corresponding to the tuple from the write request. These steps are similar to steps 520 and 525, respectively, as described above.

If the existing key that was used to encrypt the data is out of date, the middleware 160 passes to the cryptography service 180 the OT data, the AAD, and an identifier signifying the new key is to be used for a first encryption 950. In this case, the new key is different from the existing (i.e., old) key listed in the ET for that tuple and ET row combination. The middleware 160 also passes to the cryptography service 180 another identifier signifying that the old key is also to be used for a second encryption 950 operation.

The cryptography service 180 returns both the data encrypted with the new key as well as the data encrypted with the old key to the middleware 160. The middleware 160 performs two separate writes. The new data encrypted with the old key overwrites 955 the cipher text column of the existing row in the ET where older data was previously written. The new data encrypted with the new key is also written 960 to the cipher text column of a new row in the ET, along with the tuple and the generation identifier of the new key.

Writing two different versions of the data allows the middleware 160 to validate whether or not the encryption with the new key is working properly. Either upon each read request or in batch on an event-driven basis, the middleware 160 performs a validation (not shown) to determine whether the encryption of the data with the new key is working properly. This may include decrypting both rows, one containing the data encrypted with the new key and one containing the data encrypted with the old key, and comparing the decrypted results. Once all of the rows of the OT have been encrypted with the new key and a sufficient number of validations indicate that the encryption is working, the rows of the ET encrypting the data with the old key can be deleted from the ET.

IX. Advantages

The encryption system described herein has a number of advantages. First, database schemas can be exceptionally expensive to changeover. For a large scale system that has anywhere from thousands to billions of users, and based upon the amount of data stored for each user, even minor changes to a database schema might involve storage capacity issues, legacy software based on the schema, developer time to work out software bugs, etc. Using an ET and the encryption processes described herein avoids these costs and complexities as it does not require an adjustment to existing database schema. The ET operates in conjunction with existing databases, as a separate repository during migration, and ultimately as the only repository over time.

Encryption can be added incrementally, at the convenience of the developer. Activation can take place on a column by column basis allowing encryption to be scaled gradually in place without the need to interrupt regular operation of the system or the database.

During migration of a column to be encrypted to the ET, safe write allows the administrator to ensure that the encryption is working before write protection is disabled. If the encryption is not working and data is failing to be decrypted correctly, with safe write the middleware can fall back to the OT to obtain the data, to ensure seamless operation from the point of view of the application 150 and the user 101. While safe write activation of the ET for a particular column of data in a table initially results in data duplication for that column, once migration is complete duplication can be stopped, and the original data can be deleted from the OT. Thus, the ET results in only a small net increase in the size of the database.

The encryption system can also be added on top of an existing encryption system where some data is encrypted with a legacy encryption in an OT. The write protection system is equally able to handle unencrypted data as well already encrypted data. Once migration is complete, the both the originally encrypted data and the unencrypted data can be deleted, thus phasing out legacy encryption systems, allowing for a simpler encryption system that is centrally managed by the middleware 160.

The migration system can be used not only to migrate unencrypted or legacy encrypted from an OT into the ET, but it can also be used to migrate between generations of cryptographic keys. Similarly to the initial migration process, this can occur on a column by column basis or on an individual write by write basis, allowing key migration to be a seamless, low overhead process that occurs as gradually or as quickly as the administrator desires. Also similarly to the initial migration, safe write may be temporarily used to store the data encrypted with the old key to prevent data loss in the event that a new key causes encryption issues.

X. Additional Considerations

Although the ET has been introduced in terms of language associated with SQL databases (e.g., with reference to primary keys and rows), the ET and OTs may be structured to operate in other types of database systems that use different technology and terminology (e.g., key/value as opposed to primary key/row).

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A" and/or "110B" in the figures).

Some portions of this description describe the embodiments of the invention in terms of algorithms and symbolic representations of operations on information (also referred to as data). Examples include encryption, decryption, primary keys, passwords, and cipher texts. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to various arrangements of operations as "business logic", "modules", "software", "software instructions", "computer program instructions", and "middleware" without loss of generality. The described operations may be embodied in software, firmware, hardware, or any combinations thereof.

Generally, the operations described herein are sufficiently numerous in quantity, and individually are sufficiently complex so in order to achieve the desired outcome in a reasonable amount of time (e.g., performing many such operations in the space of seconds, minutes, or hours) that consequently these operations can only carried out by a computing device including a processor. Thus, these operations cannot be performed by the human mind in any reasonable amount of time, particularly for business applications where expediency is important.

In one embodiment, the operations described herein are implemented in a software module as computer program instructions (also referred to as computer program code) that is stored using a persistent computer-readable storage medium, where the software module can be executed by a computer processor.

Finally, the language used in the specification has been principally selected for readability and instructional purposes, and it may not have been selected to delineate or circumscribe the inventive subject matter. Persons skilled in the relevant art can appreciate that many modifications and variations are possible in light of the above disclosure. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth at least in part by the following claims.

What is claimed is:

1. A computer implemented method comprising:

receiving a read request to a database, the read request specifying an original table (OT) name of one of a plurality of tables in the database and a column name of one of a plurality of columns in the OT;

determining an OT row identifier identifying a row of the OT where a data entry was to be read from;

determining, based on the OT name, column name, and row identifier, that an encrypted data entry corresponding to the read request does not exist in an encrypted table (ET) which is different than the OT;

responsive to determining that an encrypted data entry, corresponding to the read request, does not exist in the ET:

retrieving the data entry from a first location in the OT corresponding to the column name and the OT row identifier; and preparing an additional authenticated data (AAD) comprising the OT name, the column name, and the OT row identifier;

obtaining a cipher text based on the data entry and the AAD, wherein the cipher text encodes the data entry and the AAD together;

writing the cipher text to an ET location in a cipher text column of the ET, the ET location in a row of the ET also storing the OT name, the column name, and the OT row identifier; and returning the data entry in response to the read request.

2. The computer implemented method of claim 1, wherein the OT row identifier is an OT primary key identifying a row of the OT.

3. The computer implemented method of claim 1, further comprising:

deleting the data entry from the OT.

4. The computer implemented method of claim 1, wherein determining that an encrypted data entry corresponding to the read request does not exist in the ET comprises checking if a row of the ET matches a tuple of the OT name, column name, and OT row identifier.

5. The computer implemented method of claim 1, wherein obtaining the cipher text comprises:
- communicating the data entry, the AAD, and an identification of a cryptographic key to a cryptography service; and
- responsive to the communication, receiving a cipher text from the cryptography service.

6. The computer implemented method of claim 1, further comprising:
- accessing the row of the ET corresponding to the OT row identifier;
- creating a second AAD based on at least some of the contents of the row other than the cipher text;
- communicating the cipher text and the second AAD to a cryptography service;
- responsive to the cryptography service returning the data entry, validating the encryption as successful; and
- responsive to the cryptography service returning a decryption error, reporting that the encryption was unsuccessful or that a write attack has occurred.

7. The computer implemented method of claim 1, wherein writing the cipher text to the ET location further comprises:
- writing the OT name to an original table column in the row of the ET;
- writing the column name to a column name column in the row of the ET; and
- writing the OT row identifier to an OT primary key column in the row of the ET.

8. A computer implemented method comprising:
- receiving a read request to a database, the read request specifying an original table (OT) name of one of a plurality of tables in the database and a column name of one of a plurality of columns in the OT;
- determining an OT row identifier identifying a row of the OT where a data entry was to be read from;
- determining, based on the OT name, column name, and OT row identifier, a row of an encrypted table (ET) which is different than the OT, the row of the ET associated with the read request;
- responsive to determining that an encrypted data entry, corresponding to the read request, does exist in the ET:
  - reading, from the row of the ET, a cipher text from a cipher text column; and
  - preparing an additional authenticated data (AAD) comprising the OT name, the column name, and the OT row identifier;
- obtaining an ET data entry based on the cipher text and the AAD; and
- returning the ET data entry in response to the read request.

9. The computer implemented method of claim 8, further comprising:
- retrieving an OT data entry from a first location in the OT corresponding to the column name and the OT row identifier;
- comparing the ET data entry and the OT data entry; and
- responsive to determining, based on the comparing, that the ET data entry matches the OT data entry, validating the encryption as successful.

10. The computer implemented method of claim 9, further comprising:
- responsive to determining, based on the comparing, that the ET data entry does not match the OT data entry, reporting that the encryption was unsuccessful or that a write attack has occurred.

11. The computer implemented method of claim 9, further comprising:
- deleting the data entry from the OT.

12. The computer implemented method of claim 8, wherein the OT row identifier is an OT primary key identifying a row of the OT.

13. The computer implemented method of claim 8, wherein the row of the ET also stores the OT name, the column name, and the OT row identifier.

14. The computer implemented method of claim 8, wherein obtaining the ET data entry comprises:
- communicating a decryption request comprising the cipher text, the AAD, and an identification of a cryptographic key to a cryptography service; and
- responsive to the decryption request, receiving the ET data entry from the cryptography service.

15. A non-transitory computer readable medium comprising instructions that, when executed by a processor of a device, cause the processor to perform the steps of:
- receiving a read request to a database, the read request specifying an original table (OT) name of one of a plurality of tables in the database and a column name of one of a plurality of columns in the OT;
- determining an OT row identifier identifying a row of the OT where a data entry was to be read from;
- determining, based on the OT name, column name, and row identifier, that an encrypted data entry corresponding to the read request does not exist in an encrypted table (ET) which is different than the OT;
- responsive to determining that an encrypted data entry, corresponding to the read request, does not exist in the ET:
  - retrieving the data entry from a first location in the OT corresponding to the column name and the OT row identifier; and
  - preparing an additional authenticated data (AAD) comprising the OT name, the column name, and the OT row identifier;
- obtaining a cipher text based on the data entry and the AAD, wherein the cipher text encodes the data entry and the AAD together;
- writing the cipher text to an ET location in a cipher text column of the ET, the ET location in a row of the ET also storing the OT name, the column name, and the OT row identifier; and
- returning the data entry in response to the read request.

16. The non-transitory computer readable medium of claim 15, wherein the OT row identifier is an OT primary key identifying a row of the OT.

17. The non-transitory computer readable medium of claim 15, wherein the steps further comprise:
- deleting the data entry from the OT.

18. The non-transitory computer readable medium of claim 15, wherein determining that an encrypted data entry corresponding to the read request does not exist in the ET comprises checking if a row of the ET matches a tuple of the OT name, column name, and OT row identifier.

19. The non-transitory computer readable medium of claim 15, wherein obtaining the cipher text comprises:
- communicating the data entry, the AAD, and an identification of a cryptographic key to a cryptography service; and
- responsive to the communication, receiving a cipher text from the cryptography service.

20. The non-transitory computer readable medium of claim 15, wherein the steps further comprise:
- accessing the row of the ET corresponding to the OT row identifier;
- creating a second AAD based on at least some of the contents of the row other than the cipher text;

communicating the cipher text and the second AAD to a cryptography service;
responsive to the cryptography service returning the data entry, validating the encryption as successful; and
responsive to the cryptography service returning a decryption error, reporting that the encryption was unsuccessful or that a write attack has occurred.

* * * * *